(12) United States Patent
Lopez Rubio et al.

(10) Patent No.: US 9,979,171 B2
(45) Date of Patent: May 22, 2018

(54) TUBULAR PARTS AND EMBEDDABLE ELECTRICAL BOXES

(71) Applicants: Sebastian Lopez Rubio, Elche (ES); Ruben Vicente Cerezo Candela, Elche (ES)

(72) Inventors: Sebastian Lopez Rubio, Elche (ES); Ruben Vicente Cerezo Candela, Elche (ES)

( * ) Notice: Subject to any disclaimer, the term of this patent is extended or adjusted under 35 U.S.C. 154(b) by 0 days. days.

(21) Appl. No.: 15/307,514

(22) PCT Filed: Apr. 30, 2015

(86) PCT No.: PCT/ES2015/070357
§ 371 (c)(1),
(2) Date: Oct. 28, 2016

(87) PCT Pub. No.: WO2015/166131
PCT Pub. Date: Nov. 5, 2015

(65) Prior Publication Data
US 2017/0054281 A1    Feb. 23, 2017

(30) Foreign Application Priority Data

May 2, 2014    (ES) .............................. 201430591 U

(51) Int. Cl.
*H02G 3/12*    (2006.01)
*H02B 1/40*    (2006.01)
(Continued)

(52) U.S. Cl.
CPC ........... *H02G 3/12* (2013.01); *B23B 51/0426* (2013.01); *H02B 1/46* (2013.01); *H02G 3/121* (2013.01); *B23B 2251/46* (2013.01)

(58) Field of Classification Search
CPC ............ H02G 3/08; H02G 3/081; H02G 3/12; H02G 3/121; H02G 3/123; H02G 3/18;
(Continued)

(56) References Cited

U.S. PATENT DOCUMENTS 3,160,458 A * 12/1964 Arthur, Jr. .............. H02G 3/123
174/54
4,638,115 A * 1/1987 Benscoter .............. H02G 3/185
174/482

(Continued)

FOREIGN PATENT DOCUMENTS

| EP | 2615708 A1 | 7/2013 |
| ES | 2200284 T3 | 3/2004 |
| ES | 2413029 T3 | 7/2013 |

OTHER PUBLICATIONS

International Search Report dated Aug. 3, 2015 for PCT/ES2015/070357 and English translation.

*Primary Examiner* — Angel R Estrada
(74) *Attorney, Agent, or Firm* — Lucas & Mercanti, LLP

(57) ABSTRACT

The invention relates to a tubular part, an embeddable electrical box and kits formed by both. The tubular part is characterized by a rib that runs helically along its external surface, and by internal support means. The electrical box comprises the tubular part and a cup which fits together with the tubular part and which has break points and external projections. The kits facilitate the assembly of the tubular part and of the electrical box.

15 Claims, 5 Drawing Sheets

(51) Int. Cl.
*B23B 51/04* (2006.01)
*H02B 1/46* (2006.01)

(58) Field of Classification Search
CPC ...... H02G 3/185; H02G 1/00; B23B 51/0426; B23B 2251/46; H01H 9/02
USPC ....... 174/480, 481, 50, 53, 57, 58, 491, 502, 174/503, 535, 559, 560, 561, 61; 220/3.2–3.9, 4.02; 248/906
See application file for complete search history.

(56) References Cited

U.S. PATENT DOCUMENTS

| | | | | |
|---|---|---|---|---|
| 7,667,136 | B2* | 2/2010 | Dinh | H02G 3/123 174/50 |
| 7,902,459 | B2* | 3/2011 | Lehr | H02G 3/14 174/481 |
| 8,581,098 | B2* | 11/2013 | Von Gal | H02G 3/123 174/481 |
| 8,671,702 | B1* | 3/2014 | Shotey | B28D 1/041 29/592 |
| 9,265,163 | B2* | 2/2016 | Moule | H02G 3/123 |

* cited by examiner

TUBULAR PARTS AND EMBEDDABLE ELECTRICAL BOXES

CROSS REFERENCE TO RELATED APPLICATION

This Application is a 371 of PCT/ES2015/070357 filed on Apr. 30, 2015, which claims priority of Spanish Application No. U201430591 filed May 25, 2014, both of which are incorporated herein by reference.

TECHNICAL FIELD OF THE INVENTION

The present invention describes tubular parts suitable for being used as embeddable electrical boxes, electrical distribution boxes, electrical mechanisms or electrical connection boxes.

The tubular parts described are characterized by the presence of a rib running across the outer surface of the tubular part through a helical path, and by the presence of support means inside the part for screwing the part into the wall, such as longitudinal channels, for example, suitable for placing screws or other securing means. Additionally, the tubular part is coupled to a receptacle.

BACKGROUND OF THE INVENTION

In recent years building with prefabricated plaster boards with a paper, cardboard or paint covering has become popular in recent years, such as those marketed under the Pladur® brand, for example. The use of prefabricated boards allows building quickly. Once the inner structure is manufactured, the different water, gas, telecommunications or light installations and their respective outer taps or mechanisms are done.

In the particular case of electric installations, the state of the art describes different anchoring or embedding systems for electrical mechanisms in the wall. One of the most widely used methods are boxes for the electrical gear which are fixed to the wall by means of through screws and a perforated clamp which adjusts to the thickness of the partition, locking onto the rear portion of the partition.

These systems have different drawbacks. The process is slow because the operator has to screw in at least two screws for fixing the box to the wall. The box cannot be embedded with its outer portion flush with the wall because the boxes have a support in the transverse direction and projecting outwardly above their side wall of the contour thereof, which support is intended for being supported on the outer surface of the wall and projecting from the front face of the wall.

The continuous repetition of applying screws can injure operators. For example, if screws are applied by hand, it can cause joint problems. If screws are applied with a machine, the vibrations and noises generated by these machines cause the operator discomfort.

Patent document ES 241329T3 describes a monoblock box provided with nuts and a screw. Patent document ES 2200284T3 describes an embeddable electrical box without screws, but comprising gripping pins associated with a lever with notching means, where the construction of the electrical box with the interconnection of several elements increases manufacturing costs. The placement of the screws and of the outer ring is slow, while the use of flanges produces a non-removable fixing.

The state of the art does not show any fixing system for electrical boxes characterized by the presence of ribs on the outer surface of the box which screw said box directly into the wall.

The problem solved by the invention is that an electrical connection box is obtained which allows a quicker assembly, installs the electrical boxes flush with the wall, improves the fixing to the wall, does not cause or reduces injuries in operators, in which the mechanisms and their trim frames are not separated from the wall and having a simple and more cost-effective manufacture.

The solution found by the inventors is a tubular part that screws directly into the wall. Therefore, a quick fixing is obtained by means of turning using the support means of the inside of the tubular part, without damaging the wall, by increasing the attachment to said wall and without having to use screws or gripping pins.

DESCRIPTION OF THE INVENTION

Definitions

The term "tubular part" is understood as a hollow conical or cylindrical part.

The term "receptacle" is understood as a part having a cylindrical or conical section with a base in the lower portion thereof.

The term "upper portion" corresponds to the portion located in the outer portion of the wall after placing the parts in the wall, i.e., the upper portion of the tubular part corresponds to the outer face of the longitudinal channels in which screws or other securing means are placed and/or where the receptacle is introduced.

The term "lower portion" corresponds to the portion located in the inner portion of the wall after placing the parts in the wall, i.e., the lower portion corresponds to the face opposite the upper portion, characterized by an inner projection.

The term "insulating" is understood as any non-conductive material suitable for electrical installations.

In a first aspect of the invention, the tubular part (1) comprises on its side surface a rib (6) projecting from the surface and running along the outer surface of the tubular part through a helical path. The tubular part comprises in the inner portion thereof support means for screwing in.

Figure 1:
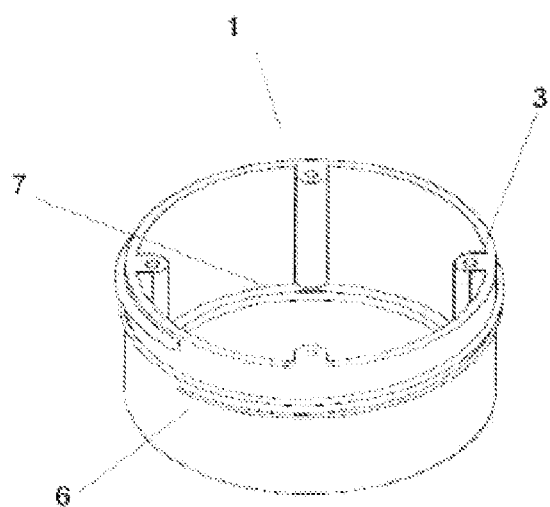
FIG. 1 shows a perspective view of the tubular part.

The support means can be at least two longitudinal channels (3) suitable for housing screws or other securing means. FIG. 1 shows the orientation of the tubular part (1) with four longitudinal channels: the upper portion of the tubular part (1) corresponds to the area where the screws or other securing means are introduced. The prefabricated plaster wall is perforated with a circular crown drill. The tubular part (1) is held in the operator's hand by the upper portion thereof, introduced in the wall and screwed in using the support means inside the tubular part. The lower portion of the tubular part (1) will be located in the inner portion of the wall, while the upper portion of the tubular part (1) will be located in the outer face of the wall. The rib (6) allows, by means of the turns made with the aid of the support means, the tubular part to be completely embedded in the wall, because the rib produces a threaded surface in the wall. In a preferred embodiment, the tubular part (1) is embedded using two channels (3) as a support point for making the turn.

Figure 6:
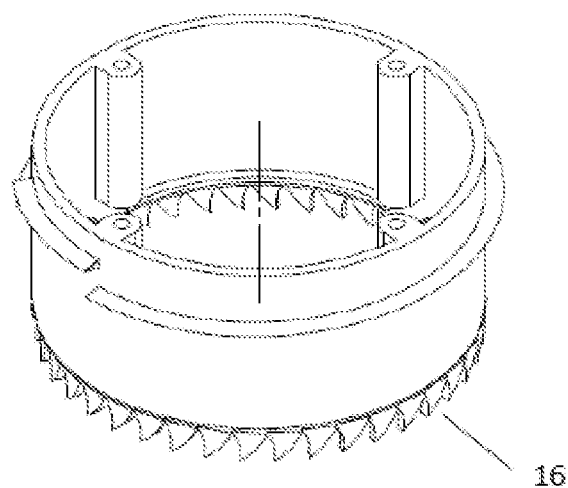
FIG. 6 shows a tubular part with serrated edges.

In a preferred embodiment, the tubular part has a serrated edge (11, FIG. 6) in the lower portion thereof. The serrated edge allows making holes in the wall directly. To make it easier to perforate the wall, the serrated edge can have metallic elements or diamonds.

The tubular part (1) embedded in the wall is suitable for being used as an electrical box or as a support for pictures or paintings, light fixtures, wall fittings, shelves, etc. If the tubular part (1) is used as an electrical box, screws or other anchoring means for securing the electrical mechanisms, switches, trims, sockets or similar elements are placed in the channels (3). If the tubular part (1) is used as a support for other elements, eye bolts, hooks or hook nails are introduced in the channel (3).

The tubular part (1) allows quickly assembling electrical boxes, installing the tubular part (1) completely flush with the wall and giving them optimal strength. By changing the number of ribs and the length and thickness of the rib (6), the grip of the tubular part (1) with the wall could be optimized. FIG. 1 shows for example the tubular part (1) with a rib (6) running one and a half turns along the outer surface. Alternatively, the tubular part can have several ribs (6).

Once the tubular part (1) is embedded in the wall, any type of channeling from one side to another of the wall could go through the tubular part.

Figure 5:
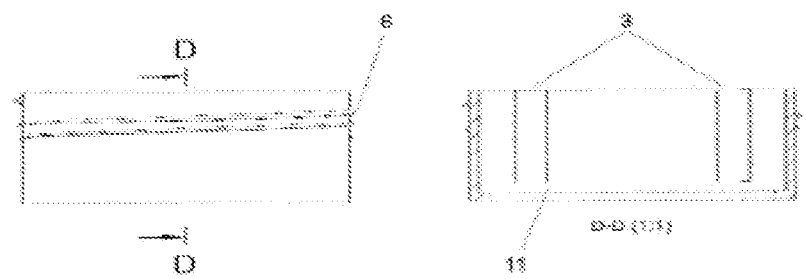
FIG. 5 shows a section of the tubular part.

In a preferred embodiment, the tubular part (1) comprises inner projections (7) in the lower portion thereof, as shown in FIG. 1. The channels (3) have a shorter length than the length of the tubular part (1), creating a rail (11) as illustrated in FIG. 5.

Figure 2:
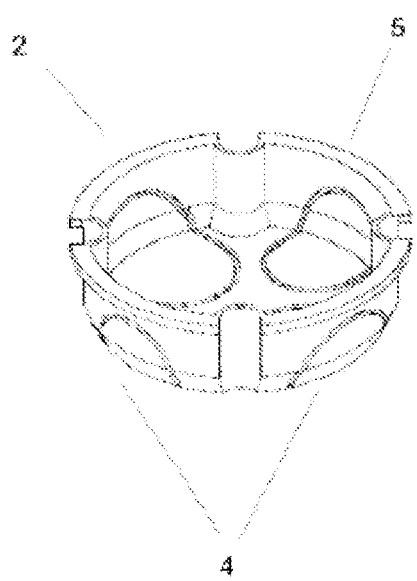
FIG. 2 shows a perspective view of the receptacle.
Figure 3:
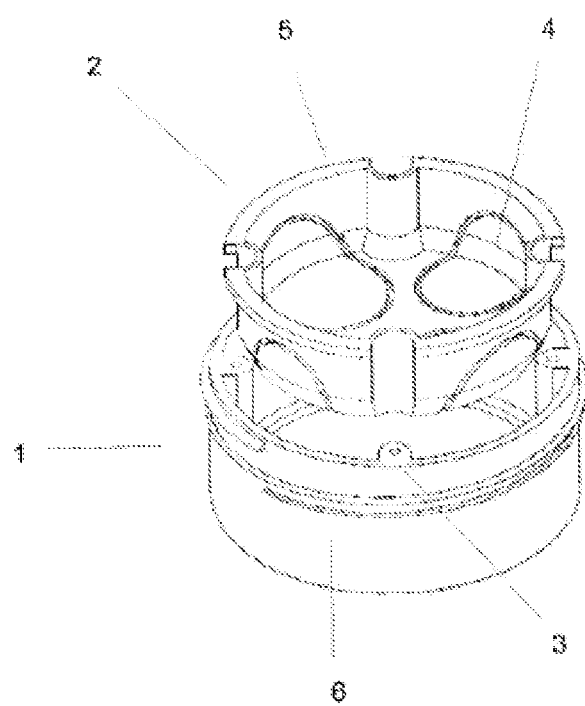
FIG. 3 shows a perspective view of the receptacle coupled to the tubular part.

In other preferred embodiments, the tubular part (1) is coupled to a receptacle (2), as shown in FIG. 3. FIG. 2 shows the orientation of the receptacle (2), where the lower portion corresponds to the base of the receptacle. The base of the receptacle (2) contains break points (4) to facilitate the passage of cables. The receptacle (2) has outer projections (5) in the upper portion thereof which coincide with the inner projections (7) present in the lower portion of the tubular part (1) when the receptacle (2) is nested in the tubular part (1), see FIG. 3.

The installation of the electrical box when the receptacle (2) is present follows the following steps: the wall is perforated with a crown drill, the tubular part (1) is screwed into the wall, being flush with it, raceway ducts or cables are passed through the tubular part, the receptacle (2) is broken at the break point (4), raceway ducts or cables are passed through the gaps created by breaking the base of the receptacle, the receptacle (2) is introduced in the tubular part (1), the receptacle (2) is moved inside the tubular part (1) until the inner projections (7) of the tubular part come into contact with the outer projections (5) of the receptacle (2) and the receptacle is turned for the purpose of fixing it to the tubular part.

The presence of a channel (11) allows the receptacle (2) to turn when it is nested in the tubular part (1). This turning allows avoiding tension in the cables.

The advantage of the system with respect to other methods of placing electrical boxes is that it is quicker, easier and improves strength and all the parts can be placed on one side of the wall and the wall does not have to be dismantled for placing the parts.

After applying a 30 kg force perpendicular to the wall, the tubular part (1) does not come out of place and the wall is not damaged, but when the same force is applied on a distribution box clamped down with screws, the box comes out of the wall.

Given that the receptacle (2) is nested in the tubular part (1) as shown in FIG. 3, the volume of the receptacle/tubular part assembly is equal to the volume of the tubular part (1), thereby reducing volumes during transport. Furthermore, the stowed volume of the electrical boxes described in the invention is less than the volumes of the monoblock boxes described in the state of the art, reaching standard measurements once it is assembled.

The diameter of the tubular part (1) is comprised between 25 millimeters and 100 millimeters. In a preferred embodiment, the tubular part (1) has a diameter of 70 millimeters so it can be coupled to the mechanisms and standard drill crowns.

Figure 4:
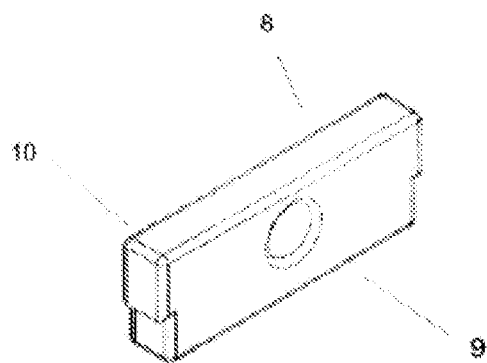
FIG. 4 shows the tightening part.
Figure 7:
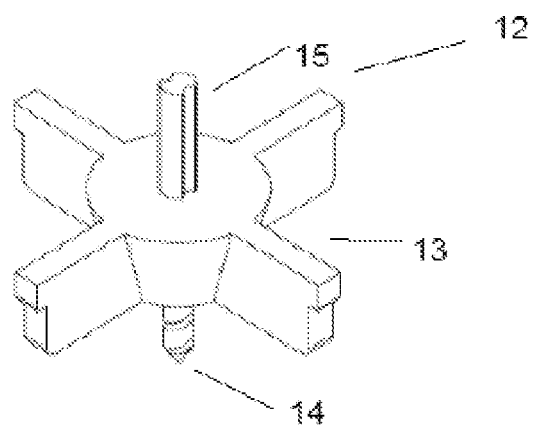
FIG. 7 shows the tightening part for a drill.

The part can be screwed into the wall with one hand or with the aid of parts (8, 12) of FIGS. 4 and 7.

The flat part (8) contains a rectangular base (9) the length of which is equal to the inner diameter of the tubular part (1) and is provided with a surface suitable for gripping with the fingers (10). The flat part (8) is introduced inside the tubular part (1) and the tubular part (1) is tightened using the support points inside the tubular part.

The part for a drill (12) of FIG. 7 is formed by a shank (15) for being coupled to a drill chuck, and it comprises support means (13) for the tubular part formed by radial arms and ends in a centering pilot bit (14) marking and fixing the drilling point. The part (12) allows effortlessly screwing the parts in more quickly and without having to initially perforate the wall with a crown drill, particularly when the tubular part (1) has a serrated edge (11). The part for coupling to the drill needs at least two support points, and to improve the support, the part for a drill (12) and the tubular part (1) contain 4 support points as seen in detail in FIG. 7 and FIG. 1.

The tubular part (1), the receptacle (2) and the flat rectangular part (8) can be manufactured according to the methods known by the skilled person, for example by injection.

The described system is primarily suitable for electrical conduits but it can also be used for gas, telecommunication or water conduits.

The parts described in the invention can be manufactured from any material. If the system is going to be used for electrical boxes, the material must be an insulating material. In a preferred embodiment, the parts are manufactured from PVC or halogen-free thermoplastic ABS material.

In other aspects, the tubular part described can be used as a support for hanging different objects: pictures or paintings, light fixtures, wall fittings, shelves, etc., furthermore making it easier to house elements or pass them through the wall by changing the diameter of the tubular part (1). The tubular part (1) is coupled to the wall and hook nails, eye bolts or hooks are placed in the channels (3). The attachment by means of the tubular part (1) prevents damage to the wall and allows hanging heavier objects. The tubular part allows the passage of installations, making connections or housing elements necessary for the light fixtures to operate.

The invention claimed is:

1. An embeddable installation box comprising:
   a tubular part comprising:
   an outer side surface containing at least one rib projecting from said surface, running across the outer side surface through a helical path to allow screwing said tubular part into a prefabricated plaster board; and
   an inner portion containing support means for receiving a torque that allows screwing in the tubular part;
   wherein said tubular part allows passage therethrough of installations and the housing therein of connection or support elements; and
   a receptacle that fits inside the tubular part.

2. The embeddable installation box according to claim 1, wherein the support means comprises at least two channels arranged longitudinally.

3. The embeddable installation box according to claim 2, wherein the channels have a shorter length than the length of the tubular part for creating a rail.

4. The embeddable installation box according to claim 3, wherein the rail allows the connection or support element to turn when it is nested in said tubular part.

5. The embeddable installation box according to claim 1, further comprising a lower serrated edge.

6. The embeddable installation box according to claim 2, wherein screws are inserted in the channels.

7. The embeddable installation box according to claim 1, further comprising a lower portion containing inner projections.

8. The embeddable installation box according to claim 1, wherein the tubular part is manufactured with an insulating material.

9. The embeddable installation box according to claim 1, wherein the rib runs at least one and a half turns along the outer side surface.

10. The embeddable installation box according to claim 2, wherein eye bolts, hook nails or hooks are inserted in the channels.

11. The embeddable installation box according to claim 1, wherein the receptacle comprises an upper portion having outer projections coinciding with inner projections of the tubular part, allowing movement of the receptacle inside the tubular part until the inner projections come into contact with the outer projections.

12. The embeddable installation box according to claim 1, wherein the receptacle comprises a base containing break points which allow creating gaps in said base to make it easier to pass the cable therethrough.

13. The embeddable installation box according to claim 1, wherein the rail of the tubular part allows the receptacle to turn when it is nested in said tubular part.

14. A kit comprising:
   the embeddable installation box according to claim 1; and
   a coupling part for a drill formed by:
   a shank for being coupled to a drill chuck,
   a centering pilot bit marking and fixing the drilling point, and
   support means for supporting the tubular part formed by radial arms.

15. A kit comprising:
   a tubular part for an embeddable installation box, the tubular part comprising:
   an outer side surface containing at least one rib projecting from said surface, running across the outer side surface through a helical path to allow screwing said tubular part into a prefabricated plaster board;
   an inner portion containing support means for receiving a torque that allows screwing in the tubular part; and
   at least two channels arranged longitudinally;
   wherein said tubular part allows passage therethrough of installations and the housing therein of connection or support elements; and
   a flat part with a rectangular base the side of which is equal to the inner diameter of the tubular part and is provided with a grasping point, wherein the flat part is configured to be introduced inside the tubular part for screwing said tubular part into a prefabricated plaster board using the two channels as a support point for a turning movement.

* * * * *